US007978268B2

(12) United States Patent
Chen et al.

(10) Patent No.: US 7,978,268 B2
(45) Date of Patent: Jul. 12, 2011

(54) APPARATUS FOR DIGITALLY FILTERING A VIDEO SIGNAL, AND RELATED METHOD

(75) Inventors: Szu-Ping Chen, Hsin-Chu Hsien (TW); Wen-Hsia Kung, Tao-Yaun Hsien (TW); Kuo-Yang Li, Taipei Hsien (TW)

(73) Assignee: Realtek Semiconductor Corp., Hsinchu (TW)

( * ) Notice: Subject to any disclaimer, the term of this patent is extended or adjusted under 35 U.S.C. 154(b) by 1356 days.

(21) Appl. No.: 11/467,163

(22) Filed: Aug. 25, 2006

(65) Prior Publication Data

US 2007/0046824 A1    Mar. 1, 2007

(30) Foreign Application Priority Data

Aug. 26, 2005 (TW) .................. 94129317 A

(51) Int. Cl.
*H04N 5/21* (2006.01)
*H04N 5/213* (2006.01)

(52) U.S. Cl. .................. 348/606; 348/607; 348/635
(58) Field of Classification Search .................. 348/606, 348/607, 625, 241, 248, 452; 382/260–266; 358/3.26, 3.27, 463; 345/611, 618
See application file for complete search history.

(56) References Cited

U.S. PATENT DOCUMENTS

| 4,456,922 A * | 6/1984 | Balaban et al. ............... 348/665 |
| 4,500,912 A * | 2/1985 | Bolger ........................... 348/665 |
| 5,040,064 A * | 8/1991 | Cok .............................. 348/392.1 |
| 5,081,532 A * | 1/1992 | Rabii ............................. 348/452 |
| 5,093,721 A * | 3/1992 | Rabii ............................. 348/448 |
| 5,140,436 A * | 8/1992 | Blessinger .................... 386/229 |
| 5,313,280 A * | 5/1994 | Straus ........................... 348/181 |
| 5,367,343 A * | 11/1994 | Blair ............................. 348/700 |
| 5,444,494 A * | 8/1995 | Yamamoto et al. ........... 348/448 |
| 5,467,138 A * | 11/1995 | Gove ............................. 348/452 |
| 5,530,486 A * | 6/1996 | Hong ............................. 348/663 |
| 5,689,311 A * | 11/1997 | Lee ............................... 348/674 |
| 5,717,789 A * | 2/1998 | Anderson et al. ............ 382/254 |
| 5,815,220 A * | 9/1998 | Marshall ....................... 348/727 |
| 6,295,322 B1 * | 9/2001 | Arbeiter et al. ........... 375/240.29 |
| 6,310,982 B1 * | 10/2001 | Allred et al. ................. 382/260 |
| 6,654,054 B1 * | 11/2003 | Embler ......................... 348/241 |
| 6,856,705 B2 * | 2/2005 | Perez et al. ................... 382/264 |
| 2005/0021333 A1 * | 1/2005 | Smaragdis .................... 704/236 |
| 2005/0264661 A1 * | 12/2005 | Kawanishi et al. ........... 348/248 |

* cited by examiner

*Primary Examiner* — Victor Kostak
(74) *Attorney, Agent, or Firm* — Thomas, Kayden, Horstemeyer & Risley, LLP

(57) ABSTRACT

A method for digitally filtering a video signal comprises: converting the video signal into a plurality of sampled values; determining whether distribution of at least one portion of the sampled values belongs to one of a plurality of specific types according to the sampled values; and generating a plurality of output values according to a correction operation corresponding to the one of the specific types.

10 Claims, 3 Drawing Sheets

APPARATUS FOR DIGITALLY FILTERING A VIDEO SIGNAL, AND RELATED METHOD

BACKGROUND OF THE INVENTION

1. Field of the Invention

The invention relates to display devices, and more particularly, to a digital filtering device of the display devices.

2. Description of the Prior Art

When a display device displays an image represented by an analog video signal, the distortion of the video signal may cause problems, for example, the image displayed by the display device has noises, or the image is indistinct. There are some typical indistinct phenomena of the image, for example, within the image, a black dot is not black enough, and a white dot is not white enough, which are probably caused by the smear effect over the video signal, where effects of this kind are usually referred to as the pulse smear effect. If a video object within the image has a vertical edge and the edge seems to be dragged, the dragged edge phenomenon may also be caused by the smear effect, where effects of this kind are usually referred to as the edge smear effect. In addition, if a video object within the image has a vertical edge and the edge seems to be repeated around, the typical reasons causing the repeated edge phenomenon may include the overshoot effect of the video signal, the undershoot effect of the video signal, or the ringing effect of the video signal.

One of typical reasons causing the distortion of the video signal is the frequency response of the circuitry of the display device. If the frequency response is low pass, the smear effect mentioned above may easily occur. On the other hand, if the frequency response is high pass, the overshoot/undershoot effect mentioned above may easily occur, where the ringing effect is usually introduced after the overshoot/undershoot effect.

SUMMARY OF THE INVENTION

It is an objective of the claimed invention to provide apparatuses for digitally filtering a video signal and related methods to solve the above-mentioned problem.

According to one embodiment of the claimed invention, an apparatus for digitally filtering a video signal is disclosed. The apparatus comprises: an analog-to-digital converter for converting the video signal into a plurality of sampled values; and a correction circuit for determining whether distribution of at least one portion of the sampled values belongs to one of a plurality of specific types according to the sampled values, compensating the at least one portion of the sampled values according to a correction operation corresponding to the one of the specific types to generate an output signal corresponding to the video signal. According to one embodiment of the claimed invention, a method for digitally filtering a video signal is disclosed. The method comprises: converting the video signal into a plurality of sampled values; determining whether distribution of at least one portion of the sampled values belongs to one of a plurality of specific types according to the sampled values; and generating a plurality of output values according to a correction operation corresponding to the one of the specific types.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
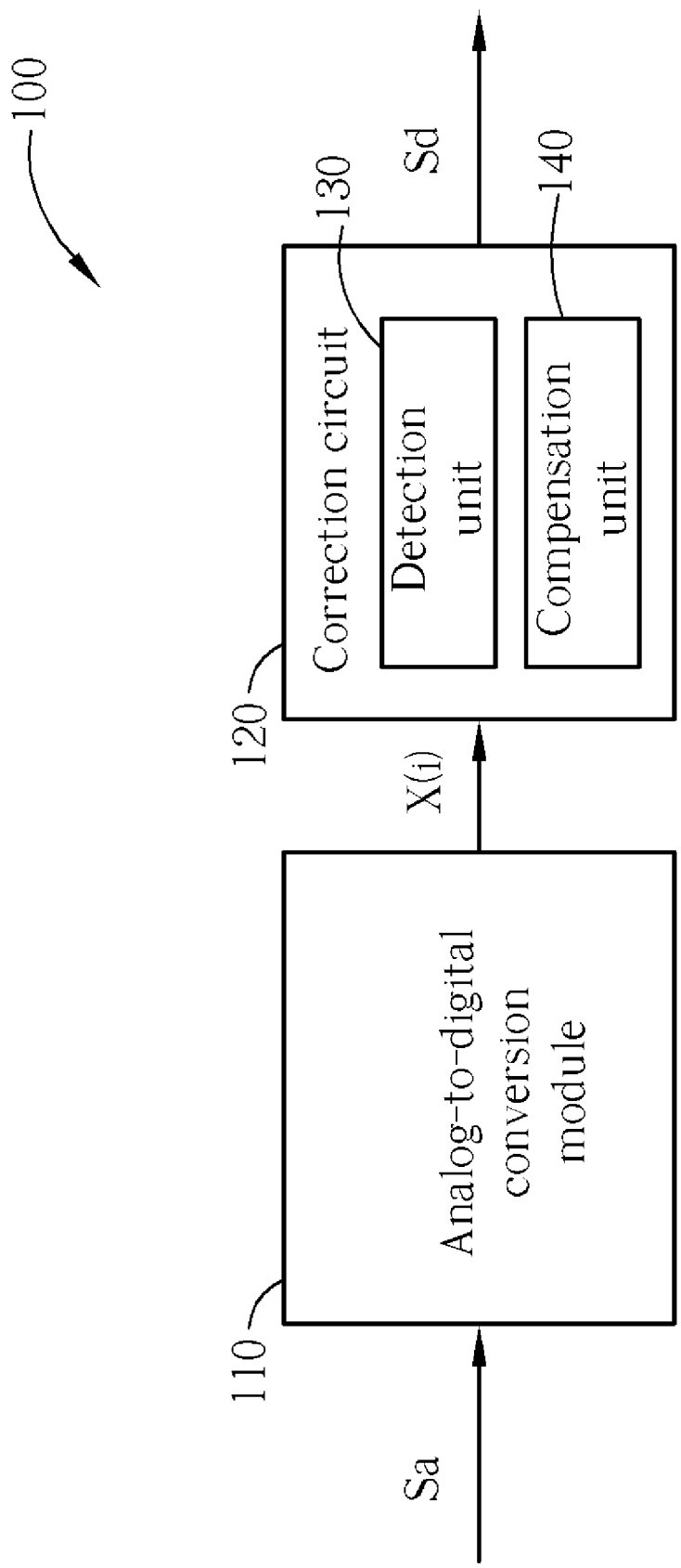
FIG. 1 is a diagram of a digital filtering device according to one embodiment of the present invention.

Please refer to FIG. 1 illustrating a diagram of a digital filtering device 100 according to one embodiment of the present invention, where the digital filtering device 100 is positioned in a display device such as an LCD monitor. The digital filtering device 100 is an apparatus utilized for digitally filtering an analog video signal Sa to correct distortion of the video signal Sa. The digital filtering device 100 comprises an analog-to-digital conversion module 110 and a correction circuit 120, where the analog-to-digital conversion module 110 comprises at least one analog-to-digital converter (not shown). Regarding digital display devices, the digital display controller thereof can be implemented by utilizing the architecture of single analog-to-digital converter or the architecture of dual analog-to-digital converters. For simplicity, within FIG. 1, the analog-to-digital conversion module 110 is illustrated for representing the two kinds of architecture that can be utilized in this embodiment.

The analog-to-digital converter(s) perform analog-to-digital conversion on the video signal Sa to sequentially generate a plurality of sampled values $X(i)$, where $i=0, 1, 2, \ldots, N$. The correction circuit 120 is capable of bypassing the sampled values $X(i)$ or performing at least one correction operation according to the sampled values $X(i)$ to generate a plurality of output values $X'(i)$, and generating a digital output signal Sd corresponding to the video signal Sa according to the output values $X'(i)$, where the digital output signal Sd carries the output values $X'(i)$. According to this embodiment, the correction circuit 120 determines whether distribution of at least one portion of the sampled values $X(i)$ belongs to one of a plurality of specific types according to the sampled values $X(i)$, and generate the output values $X'(i)$ according to the correction operation corresponding to the specific type.

Figure 2:
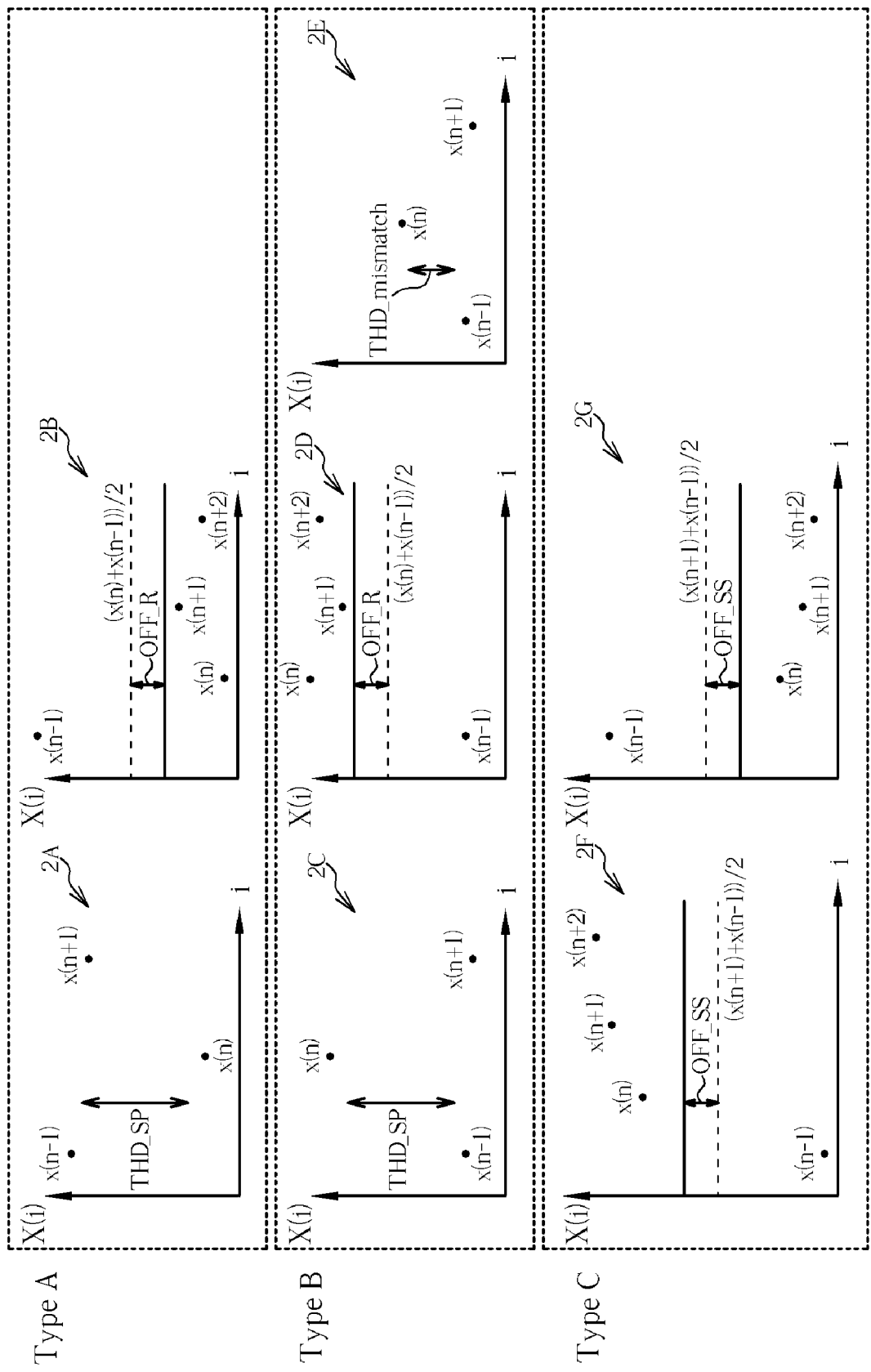
FIG. 2 is a diagram of a plurality of specific types that can be identified by the correction circuit shown in FIG. 1.

Please refer to FIG. 2 illustrating a diagram of a plurality of specific types A, B, and C that can be identified by the correction circuit 120 shown in FIG. 1, where the sequentially generated sampled values $X(n-1)$, $X(n)$, and $X(n+1)$ are a portion of the sampled values $X(0), X(1), \ldots,$ and $X(N)$. The correction circuit 120 identifies the type of the distortion of the video signal Sa as specific type(s) according to whether the difference between the sampled values $X(n-1)$ and $X(n)$ is greater than or smaller than zero and according to whether the difference between the sampled values $X(n)$ and $X(n+1)$ is greater than or smaller than zero. As shown in FIG. 2, if $X(n+1)-X(n)>0$ and $X(n)-X(n-1)<0$, the type of the distortion of the video signal Sa can be identified as Type A; if $X(n+1)-X(n)<0$ and $X(n)-X(n-1)>0$, the type of the distortion of the video signal Sa can be identified as Type B; if $X(n+1)>X(n)>X(n-1)$ (i.e., $X(n+1)-X(n)>0$ and $X(n)-X(n-1)>0$) or $X(n+1)<X(n)<X(n-1)$ (i.e., $X(n+1)-X(n)<0$ and $X(n)-X(n-1)<0$), the type of the distortion of the video signal Sa can be identified as Type C.

Figure 3:
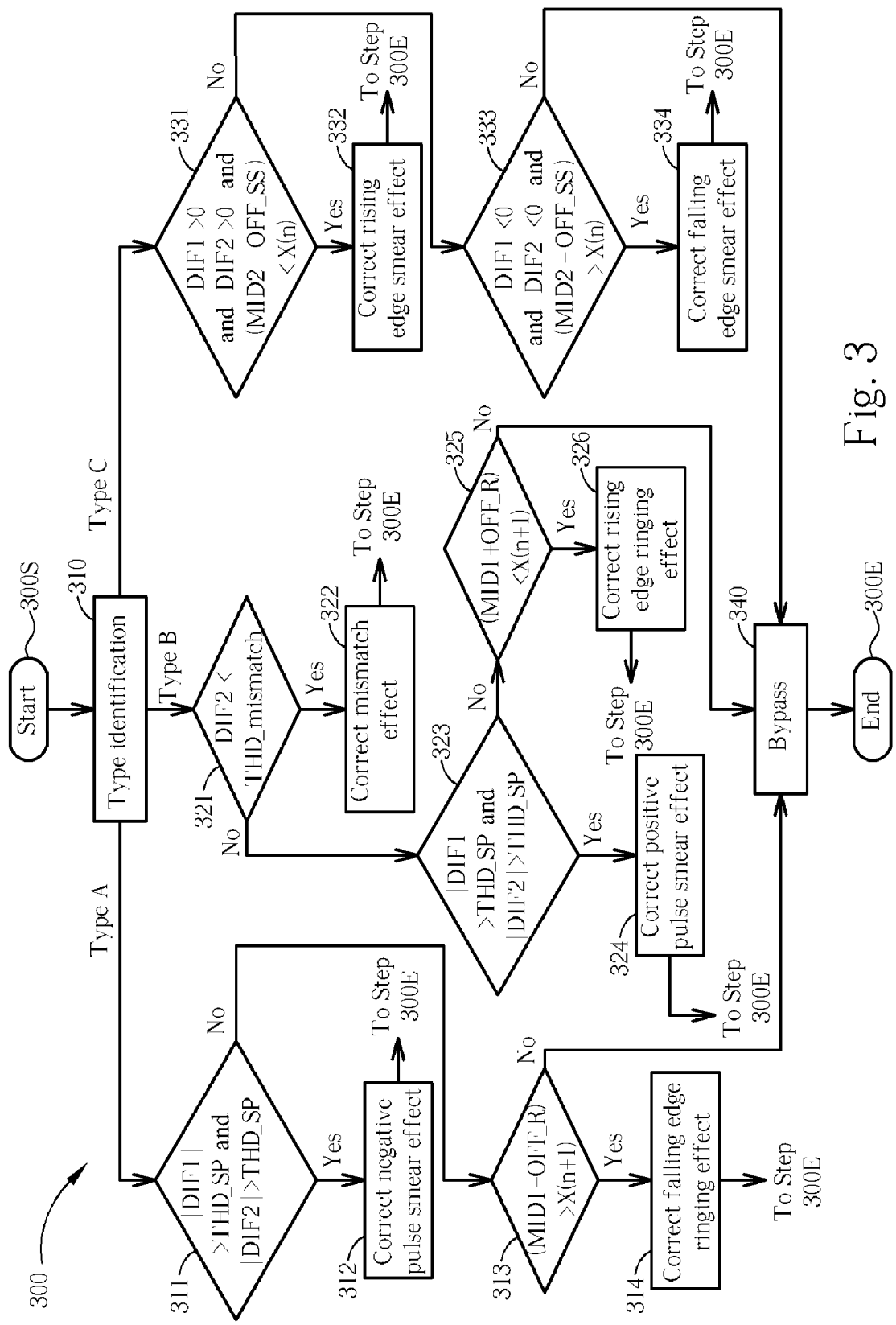
FIG. 3 is a flowchart of a digital filtering method according to the present invention.

According to this embodiment, the identification of the types such as Type A, Type B, or Type C is merely the initial classification, where further detailed classification according to Type A, Type B, or Type C and the corresponding correction operations are illustrated as shown in FIG. 3. FIG. 3 is a flowchart of a digital filtering method according to the present invention. The correction circuit 120 further identifies the type of the distortion according to an average MID1 of the sampled values $X(n-1)$ and $X(n)$, an average MID2 of the sampled values $X(n-1)$ and $X(n+1)$, a difference DIF1 between the sampled values $X(n+1)$ and $X(n)$, a difference DIF2 between the sampled values $X(n)$ and $X(n-1)$, and at least one threshold value such as these thresholds shown in FIG. 3, for example, the threshold THD_SP utilized in Step 311, the threshold OFF_R utilized in Step 313, the threshold THD_mismatch utilized in Step 321, the threshold OFF_SS utilized in Step 331, and so on. According to this embodiment, $DIF1=X(n+1)-X(n)$ and $DIF2=X(n)-X(n-1)$, and the thresholds can be respectively set as certain predetermined value(s) by the firmware of the display device, where the predetermined value(s) can be determined in advance according to trial experiments while the display device receives different video signals.

In an embodiment such as the embodiment shown in FIG. 1, the correction circuit 120 comprises a detection unit 130 and a compensation unit 140. In general, the detection unit 130 is utilized for determining whether distribution of at least one portion of the sampled values $X(i)$ belongs to one of a plurality of specific types (for example, the plurality of specific types mentioned above), where the compensation unit 140 performs the corresponding correction operation according to the specific type.

According to whether the criteria defined by the inequalities shown in Step 311, 313, 321, 323, 325, 331, and 333 are respectively matched, the correction circuit 120 is capable of determining whether to execute Step 312 (which correct the negative pulse smear effect such as the situation of Type 2A shown in FIG. 2), determining whether to execute Step 314 (which correct the falling edge ringing effect such as the situation of Type 2B shown in FIG. 2), determining whether to execute Step 322 (which correct the mismatch effect such as the situation of Type 2E shown in FIG. 2), determining whether to execute Step 324 (which correct the positive pulse smear effect such as the situation of Type 2C shown in FIG. 2), determining whether to execute Step 326 (which correct the rising edge ringing effect such as the situation of Type 2D shown in FIG. 2), determining whether to execute Step 332 (which correct the rising edge smear effect such as the situation of Type 2F shown in FIG. 2), and determining whether to execute Step 334 (which correct the falling edge smear effect such as the situation of Type 2G shown in FIG. 2), to compensate signal distortion.

Regarding various correction operations related to the present invention, please refer to the following explanation.

For example, in Step 312, the correction operation for correcting the negative pulse smear effect comprises: calculating a decrement $((-DIF2)-THD\_SP)/(2^\wedge DIV\_PE)$; and decreasing the sampled value $X(n)$ according to the decrement to generate the output value $X'(n)$ corresponding to the sampled value $X(n)$. That is, $X'(n)=X(n)-((-DIF2)-THD\_SP)/(2^\wedge DIV\_PE)$. Similarly, in Step 324, the correction operation for correcting the positive pulse smear effect comprises: calculating an increment $(DIF2-THD\_SP)/(2^\wedge DIV\_PE)$; and increasing the sampled value $X(n)$ according to the increment to generate the output value $X'(n)$ corresponding to the sampled value $X(n)$. That is, $X'(n)=X(n)+(DIF2-THD\_SP)/(2^\wedge DIV\_PE)$.

For example, in Step 314, the correction operation for correcting the falling edge ringing effect comprises: calculating a decrement $((MID1-OFF\_R)-X(n+1))/(2^\wedge DIV\_Ring\_Pos)$; and decreasing the sampled value $X(n+1)$ according to the decrement to generate the output value $X'(n+1)$ corresponding to the sampled value $X(n+1)$. That is, $X'(n+1)=X(n+1)-((MID1-OFF\_R)-X(n+1))/(2ADIV\_Ring\_Pos)$. Similarly, in Step 326, the correction operation for correcting the rising edge ringing effect comprises: calculating an increment $(X(n+1)-(MID1+OFF\_R))/(2^\wedge DIV\_Ring\_Pos)$; and increasing the sampled value $X(n+1)$ according to the increment to generate the output value $X'(n+1)$ corresponding to the sampled value $X(n+1)$. That is, $X'(n+1)=X(n+1)+(X(n+1)-(MID1+OFF\_R))/(2^\wedge DIV\_Ring\_Pos)$.

In addition, in Step 332, the correction operation for correcting the rising edge smear effect comprises: calculating an increment $(X(n)-(MID2+OFF\_SS))/(2^\wedge DIV\_Smr\_Pos)$; and increasing the sampled value $X(n)$ according to the increment to generate the output value $X'(n)$ corresponding to the sampled value $X(n)$. That is, $X'(n)=X(n)+(X(n)-(MID2+OFF\_SS))/(2^\wedge DIV\_Smr\_Pos)$. Similarly, in Step 334, the correction operation for correcting the falling edge smear effect comprises: calculating a decrement $((MID2-OFF\_SS)-X(n))/(2^\wedge DIV\_Smr\_Pos)$; and decreasing the sampled value $X(n)$ according to the decrement to generate the output value $X'(n)$ corresponding to the sampled value $X(n)$. That is, $X'(n)=X(n)-((MID2-OFF\_SS)-X(n))/(2^\wedge DIV\_Smr\_Pos)$.

Here, the values THD_SP, DIV_PE, OFF_R, DIV_Ring_Pos, OFF_SS, and DIV_Smr_Pos can be set as certain predetermined value(s), respectively, where the predetermined value(s) can be determined in advance according to trial experiments while the display device receives different video signals.

It is noted that Step 321 and Step 322 are adaptive to the architecture of dual analog-to-digital converters, and are utilized for correcting the mismatch effect (which is also referred to as the component mismatch effect). According to whether the inequality shown in Step 321 is matched, the correction circuit 120 is capable of determining whether to perform the correction operation for correcting the mismatch effect as shown in Step 322 to correct the difference(s) between odd sampled value(s) and even sampled value(s) of the sampled values $X(i)$. Please refer to Type 2E shown in FIG. 2 together with FIG. 3. In Step 322, the correction operation for correcting the mismatch effect comprises: generating the output value $X'(n)$ corresponding to the sampled value $X(n)$ according to the sampled value $X(n-1)$ or the sampled value $X(n+1)$. That is, $X'(n)=X(n-1)$, or $X'(n)=X(n+1)$, or $X'(n)=(X(n+1)+X(n-1))/2$, where the latter equation means the output value $X'(n)$ is equal to the average of the two sampled values $X(n+1)$ and $X(n-1)$ adjacent to the sampled value $X(n)$. In this embodiment, the correction operation for correcting the mismatch effect is: $X'(n)=X(n-1)$. As Step 321 and Step 322 are not needed for the architecture of single analog-to-digital converter, regarding this architecture, if the distortion is identified as Type B in Step 310, Step 323 is then executed. In this situation, Type 2E can be omitted.

In addition, although in this embodiment, the correction operation for correcting the mismatch effect is processed when the distortion is identified as Type B, this is not a limitation of the present invention. Those skilled will appreciate that according to another embodiment of the present invention, the correction operation for correcting the mismatch effect can be processed when the distortion is identified as Type A. Of course, the types can be redefined according to other embodiments of the present invention, for example, the initial classification is performed for identifying the distortion as one of the type of smear effect, the type of ringing effect, and the type of mismatch effect, where the other operations such as the corresponding correction operation can be performed later. Similar descriptions are not repeated in detail here.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. An apparatus for digitally filtering a video signal, comprising:
    an analog-to-digital converter for converting the video signal into a plurality of sampled values; and
    a correction circuit, coupled to the analog-to-digital converter, for determining whether distribution of at least one portion of the sampled values belongs to one of a plurality of specific types according to the sampled values, and compensating the at least one portion of the sampled values according to a correction operation corresponding to the one of the specific types to generate a digital output signal corresponding to the video signal;
    wherein the specific types comprise at least one smear effect or at least one ringing effect, wherein the at least one smear effect comprises a pulse smear effect and an edge smear effect, and the at least one ringing effect comprises a rising edge ringing effect and a falling edge ringing effect.

2. The apparatus of claim 1, wherein the specific types comprise the at least one smear effect and the at least one ringing effect.

3. The apparatus of claim 2, wherein the specific types further comprise a mismatch effect.

4. The apparatus of claim 1, wherein the sampled values comprise sequentially generated sampled values $X(n-1)$, $X(n)$, and $X(n+1)$, and the correction circuit identifies a type of distortion of the video signal as the one of the specific types according to a difference between the sampled values $X(n-1)$ and $X(n)$ and a difference between the sampled values $X(n)$ and $X(n+1)$.

5. The apparatus of claim 1, wherein the correction operation comprises:
    generating a compensation value according to at least two sampled values; and
    compensating at least one of the sampled values according to the compensation value to generate an output value of the digital output signal.

6. A method for digitally filtering a video signal comprising:
    converting the video signal into a plurality of sampled values;
    determining whether distribution of at least one portion of the sampled values belongs to one of a plurality of specific types according to the sampled values; and
    generating a plurality of output values according to a correction operation corresponding to the one of the specific types;
    wherein the specific types comprise at least one smear effect or at least one ringing effect, wherein the at least one smear effect comprises a pulse smear effect and an edge smear effect, and the at least one ringing effect comprises a rising edge ringing effect and a falling edge ringing effect.

7. The method of claim 6, wherein the sampled values comprise sequentially generated sampled values $X(n-1)$, $X(n)$, and $X(n+1)$, and the determining step further comprises:
    identifying a type of distortion of the video signal as the one of the specific types according to a difference between the sampled values $X(n-1)$ and $X(n)$ and a difference between the sampled values $X(n)$ and $X(n+1)$.

8. The method of claim 6, wherein the correction operation comprises:
    generating a compensation value according to at least two sampled values; and
    compensating at least one of the sampled values according to the compensation value to generate at least one of the output values.

9. The method of claim 6, wherein the specific types comprise the at least one smear effect and the at least one ringing effect.

10. The method of claim 9, wherein the specific types comprise a mismatch effect.

* * * * *